G. D. Neal,
Revolving Rake.
No. 82,864.          Patented Oct. 6, 1868.
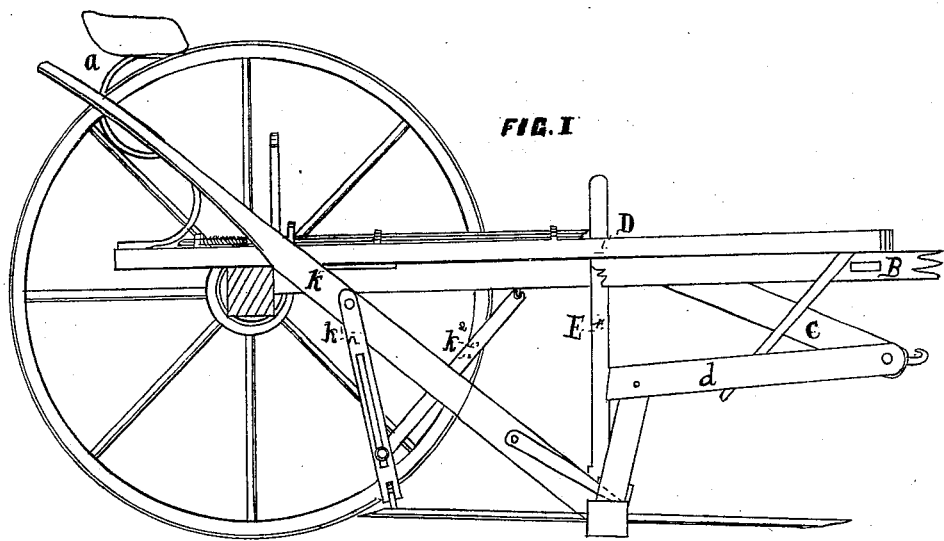
FIG. I
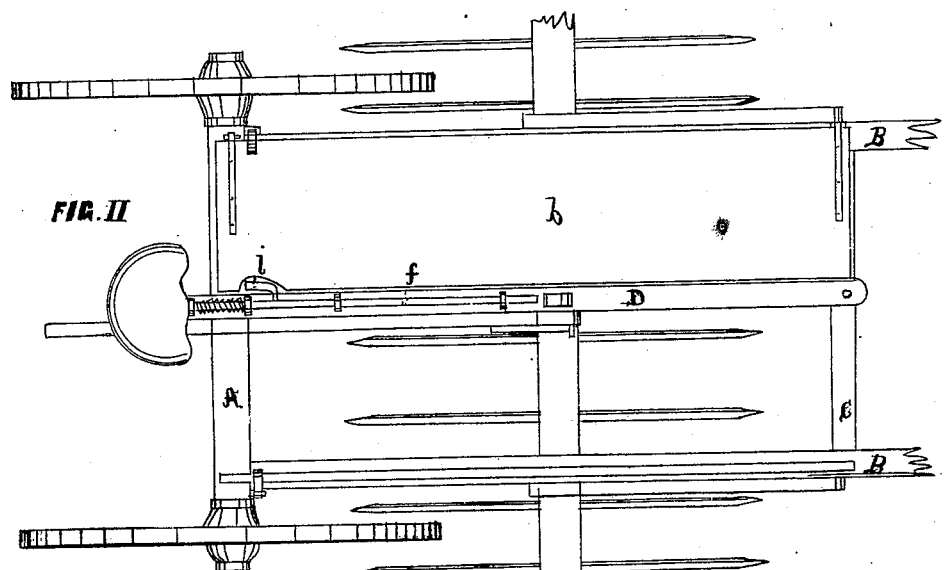
FIG. II
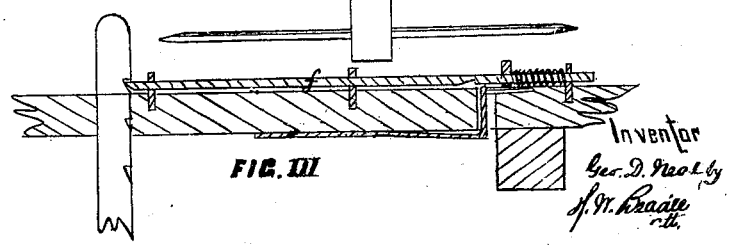
FIG. III

United States Patent Office.

GEORGE D. NEAL, OF MOUNT VERNON, OHIO.

Letters Patent No. 82,864, dated October 6, 1868.

IMPROVEMENT IN HORSE-RAKES.

*The Schedule referred to in these Letters Patent and making part of the same.*

TO ALL WHOM IT MAY CONCERN:

Be it known that I, GEORGE D. NEAL, of Mount Vernon, in the county of Knox, and State of Ohio, have invented new and useful Improvements in Revolving Horse-Rakes; and I do hereby declare that the following is a full and exact description of the same, reference being had to the accompanying drawings, and to the letters of reference marked thereon.

This invention relates to certain improvements in revolving horse hay-rakes, and consists more particularly in the following feature enumerated below, all of which are to be herein fully described, and are—

First, the construction of the frame which supports the rake, and certain trap-doors, the sides of which frame are formed by the thills of the carriage itself.

Second, an arrangement of trap-doors or double-hinged platforms for the purpose of rendering the rake-frame capable of sustaining a load in driving to or from the field.

Third, a standard, which supports the rake, and slides through a mortise, permitting the rake to rise and fall.

Fourth, a detent held back by a catch, which is operated by the foot, the detent holding up the vertical-sliding standard.

Fifth, an arrangement of jointed arms, which guide and draw the rake.

Sixth, the slotted standard attached to the lever, which turns the rake.

In the drawings—

Figure 1 represents a side view of the rake and carriage, one wheel and part of the frame being broken away to show the interior guiding and supporting-devices.

Figure 2 is a top view of the frame, with one side of the platform raised.

Figure 3 is an enlarged view through the central beam of the detent, foot-catch, and sliding guide.

The same letters refer to identical parts in all the figures.

The axle A, a straight shaft of ordinary construction, has attached to it the thills B B in any suitable manner.

Across the thills, at a point conveniently distant from the axle, is a cross-bar, C, firmly connecting the thills, and serving as support for the forward end of the platform.

Running centrally parallel with the thills is the beam D, one end resting on the cross-bar C, and the other on the axle. From the rear end of the central bar rises a spring-support, $a$, which holds the driver's seat.

To the parts of the thills which form the sides of the frame are hinged trap-doors or platforms, $b\ b$, which may be let down so as to entirely cover the frame, or may be raised and sustained vertically by any suitable standard and catches.

Underneath the thills, and at a proper distance forward to allow the rake to clear the wheels, are inclined standards, $c\ c$, strongly secured, and having pivoted to their extremities the bent arms $d\ d$, in the lower ends of which the rake revolves. These arms are so constructed and arranged as to permit the rake to rise and fall without moving greatly out of the same vertical plane, either forward or backward.

Exactly at the point of pivoting of the arms and standard are attached, preferably to the same pivot or bolt, hooks for the draught-traces. There may be also attached strips of metal or other suitable material to the standards, which serve to steady the arms against lateral sway.

To the centre of the rake-beam is attached firmly, by a clasp passing around the beam, the standard E, which slides through a mortise in the central beam D. It may be inclined in order to hold the rake more firmly, and is provided on the rear side with notches. Into these notches springs a rod, $f$, which lies upon the central beam, being held in guides and forced forward by a spring coiled about the rod, and bearing against a shoulder formed thereon. This rod is notched underneath, and is held, when drawn back, out of contact with the sliding standard by a spring-catch, $h$, which may be thrown out of gear with the rod by pressure upon the foot-piece $i$.

The sliding standard is so arranged and notched that the rake rises without resistance, pushing back the catch by means of the inclined shoulders, but when the standard is once raised, the detent being pressed forward by the spring, holds the standard by the square shoulders thereon. If, however, the detent be drawn back sufficiently far to allow the catch to spring into the notch on the under side of the detent, the standard then rises and falls freely without resistance in either direction.

By the side of the standard, and attached to the rake-beam in a similar manner, is the lever K, having attached to it a slotted iron supporter or standard, $K^1$, by a brace, $K^2$, moving in the slot, the iron having a foot arranged to press across the teeth. This lever, with its attachments, operates to guide and raise the rake, but, with the exception of the slotted arm, forms no part of my present invention. The object of this improvement is to permit brace $K^2$ to have proper play as the standard E rises and falls.

In the construction of my improved rake, the arrangement of parts whereby the thills are made to form the sides of the frame, gives at once lightness of structure and economy of material and labor in the manufacture, and is also stronger than if the shafts were attached to an independent framework.

The operation of my devices is simple and easily understood.

The rake being let down for work, the hinged platforms are raised to allow free play of the rake in its revolutions.

From the described construction of the standards $c\ c$ and arms $d\ d$ and the attached hooks, or equivalent means of connection, both the rake and the carriage are drawn from the same point, and at the same time the rake is allowed to rise and fall, as before shown, in nearly the same vertical planes, and without greatly swaying the standard E.

While the rake is in operation, the detent is drawn back from this standard, and held by its catch.

The driver can at any time cause the rake to revolve by elevating the lever K, a projection on the end of which, catching against a shoulder on the rake-beam, throws, in the ordinary manner, the rake forward on the points, and thereby causes it to revolve. As it rises, it pushes its standaad, E, freely through its mortise, and in its fall draws it down. When, however, the driver wishes to suspend the operation of raking, and to drive the rake over the field, he presses with his foot on the foot-piece, thus releasing the detent from its catch. Then, drawing up the rake by the proper lever, the detent acting on the notches in the standard E, holds the rake suitably suspended. The hinged platforms may then be let down and serve to sustain any article to be borne off the field.

It will be observed that the structure of this rake is simple, of few parts, involving little expense and liability to get out of repair, while at the same time it serves the double function of a rake and a convenient truck to carry from the field any article which may have been required for use therein.

Having thus fully described my invention, what I claim as new, and desire to secure by Letters Patent of the United States, is—

1. The arrangement of the trap-doors on the described frame, in combination with any suitable holding devices, as and for the purpose set forth.

2. The central standard E, connected to the rake-beam, and sliding through the mortise of central beam, and in combination with the outer standards and arms, substantially as shown and described.

3. In combination with such standard, I claim the spring-detent, with its catch, all constructed and operating substantially as and for the purpose set forth.

This specification signed and witnessed, this 25th day of July, 1868.

GEO. D. NEAL.

Witnesses:
    J. H. BAUHILL,
    DANIEL CHRISTY.